United States Patent Office 3,278,469
Patented Oct. 11, 1966

3,278,469
INTERPOLYMERS CONTAINING UNITS FROM A MONOCARBOXYLIC HALF ESTER OF AN α,β-ETHYLENICALLY UNSATURATED, α,β-DICARBOXYLIC ACID AND COATING COMPOSITIONS FORMULATED WITH THESE INTERPOLYMERS
Donald Anthony Pascale, Drexel Hill, Pa., assignor to E. I. du Pont de Nemours and Company, Wilmington, Del., a corporation of Delaware
No Drawing. Filed Dec. 29, 1960, Ser. No. 79,109
13 Claims. (Cl. 260—21)

This invention relates to novel interpolymers containing units from a monocarboxylic half ester of an alpha-beta ethylenically unsaturated, alpha-beta dicarboxylic acid having at least one ether oxygen atom in the alcohol moiety of the half ester and coating compositions formulated with these interpolymers. More particularly the invention relates to liquid coating compositions in which the essential organic film-forming material is a mixture of (1) a novel interpolymer made up of (A) units from styrene, (B) units from at least one ester of the general formula

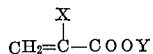

where X is H— or CH₃— and Y— is a $C_1$ to $C_8$ saturated aliphatic monovalent hydrocarbon radical, and (C) units from a monocarboxylic half ester of an alpha, beta monoethylenically-unsaturated, alpha, beta dicarboxylic acid, preferably a butenedioic acid, with a monohydric ether alcohol having from 3 to 30 carbon atoms per molecule and containing one or more ether oxygen moieties including one ether oxygen two to six carbon atoms removed from the hydroxyl radical of the monohydric ether alcohol and (2) a second organic film-forming material of the group of alcohol modified melamine-formaldehyde condensate, alcohol modified urea-formaldehyde condensate, alcohol modified benzo-guanamine-formaldehyde condensate, epoxy hydroxy polyether resin, epoxy hydroxy polyether resin esterified in part with a fatty acid, epoxidized vegetable oil and mixtures thereof.

The invention is directed particularly to baking enamels for electrical appliances such as refrigerators, freezers, washing machines and clothes driers, and for related articles such as kitchen cabinets. In this field there is a continuing search for coatings having improved properties, particularly an improved balance of properties which make the coatings unusually serviceable on such articles in the absence of underlying metal-protective prime coats. These properties include hardness, flexibility, adhesion, gloss, durability, and resistance to adverse effects from abrasion (wear), grease, fumes, foods, soaps, detergents, and other chemicals, and in the case of clothes driers, exposure to high temperatures. Simultaneously, useful products of this type, in order to be acceptable to the manufacturer of the finished article, must be capable of being applied by conventional methods and of being baked under industrial conditions to yield unblemished coatings; and they must be economical to use in relation to previously adopted coating compositions. These baking enamels require the presence of a catalyst to effect adequate cure under the ordinary baking conditions and it is desirable that the liquid coating composition includes an appropriate proportion of latent catalyst in a single product package in contrast with separate packages of uncatalyzed coating composition and catalyst to be combined immediately prior to use of the catalyzed combination.

The principal objective of this invention is to provide new interpolymers and coating compositions prepared therefrom having an improved balance of the properties required for the above-mentioned end-uses. Another objective is to provide liquid coating compositions including a latent curing catalyst therefor in a stable single package, which coating compositions are generally useful in the organic coating art as baking type finishes.

The new coating compositions of this invention are pigmented or unpigmented (clear) liquid coating compositions in which the essential organic film-forming material is a mixture of 30%–95% by weight of the new interpolymer, hereinafter described, with complementally, 70%–5% by weight of at least one of the following organic film-forming materials: melamine-formaldehyde-alcohol condensates, urea-formaldehyde-alcohol condensates, benzo-guanamine-formaldehyde-alcohol condensates, epoxidized vegetable oils, epoxy hydroxy polyether resin, epoxy hydroxy polyether resin esterified in part with a fatty acid as described hereinafter. The organic film-forming mixture is dissolved in a volatile organic solvent of the general type commonly used in the organic coating art. Well known modifiers such as curing accelerators, grinding aids, surface active agents, waxy substances and plasticizers can be present in their usual small proportions but are not required.

The products of this invention are non-aqueous, to the extent that water is not essential in the processes or products, and any which may enter with the essential ingredients is preferably kept to a minimum.

The new interpolymers of this invention, at least ternary in composition, are made up preferably, of 30 to 80 mol percent of (A) units from styrene, 15 to 65 mol percent of (B) units from at least one alpha, beta-unsaturated monovinylidene ester of the general formula

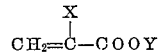

where X is H— or CH₃— and Y— is a $C_1$ to $C_8$ saturated aliphatic monovalent hydrocarbon radical, and 5 to 25 mol percent (C) units from a monocarboxylic half ester of an alpha, beta mono-ethylenically unsaturated alpha, beta dicarboxylic acid, preferably a butenedioic acid, and a monohydric ether alchol having the general formula

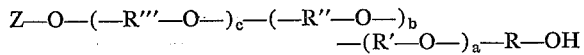

where —R— is a saturated aliphatic divalent $C_2$ to $C_6$ hydrocarbon radical; —R'—, —R''—, and —R'''— are each a $C_2$ to $C_4$ saturated aliphatic divalent hydrocarbon radical, at least —R''— being different from —R'— and —R'''—; a, b and c are each integers having a value of 0, 1, 2, 3, 4, etc., the respective values of a, b and c being such that the total number of carbon atoms in the monohydric ether alcohol is from 3 to 30, preferably no more than 24, carbon atoms; and Z—O— is a monovalent organic radical having a $C_1$ to $C_{18}$, preferably $C_1$ to $C_8$, monovalent hydrocarbon radical Z— joined to an ether oxygen atom. Particularly preferred monohydric ether alcohols have an ether oxygen moiety two carbon atoms removed from the hydroxyl radical thereof. Particularly preferred proportions of the units making up the interpolymer are 40 to 70 mol percent of the (A) units, 20 to 50 mol percent of the (B) units, and 10 to 20 mol percent of the (C) units.

Representative useful monohydric ether alcohols include:

ethylene glycol monomethyl ether
ethylene glycol monoethyl ether
ethylene glycol monopropyl ether
ethylene glycol monobutyl ether
ethylene glycol monohexyl ether
ethylene glycol monocyclohexyl ether
ethylene glycol monooctyl ether ethylene glycol mono-2-ethylhexyl ether
ethylene glycol mono-2-ethylbutyl ether
ethylene glycol mono-lauryl ether
ethylene glycol mono-benzyl ether
ethylene glycol mono-stearyl ether
ethylene glycol mono-phenyl ether
diethylene glycol mono-methyl ether
diethylene glycol mono-ethyl ether
diethylene glycol mono-propyl ether
diethylene glycol mono-butyl ether
diethylene glycol mono-hexyl ether
diethylene glycol mono-2-ethylbutyl ether
diethylene glycol mono-cyclohexyl ether
diethylene glycol mono-octyl ether
diethylene glycol mono-2-ethylhexyl ether
diethylene glycol mono-lauryl ether
diethylene glycol mono-stearyl ether
diethylene glycol mono-phenyl ether
diethylene glycol mono-benzyl ether triethylene glycol monoethers having the radical Z—O—, tetraethylene glycol monoethers having the radical Z—O—; propylene glycol monoethers, dipropylene monoethers, tripropylene glycol monoethers and higher polypropylene glycol monoethers each having the radical Z—O—; 1,3-propanediol monoethers, 1,4-butanediol monoethers, 1,5-pentanediol monoethers and 1,6-hexanediol monoethers having the radical Z—O—; polytetramethylene glycol monoethers having the radical Z—O—, monoether of mixed polyoxyalkylene glycols having the general formulae:

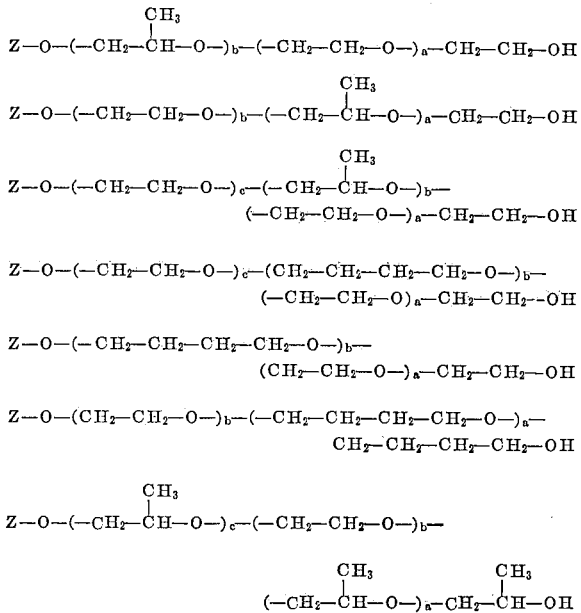

the sum of the value of the integers of *a*, *b* and *c* being at least 1. The commercially available "Ucons" are representative mixed polyoxyalkylene monohydroxy compounds which can be used. U.S. Patent 2,425,755 describes butyl monoethers of mixed polyoxyalkylene glycols derived from ethylene oxide and 1,2-propylene oxide combinations.

Monoethers having the following general formulae wherein the radical Z—O— contains up to 8 carbon atoms are preferred:

Z—O—CH₂—CH₂—OH, ethylene glycol monoethers

Z—O—CH₂—CH₂—O—CH₂—CH₂—OH, diethylene glycol monoethers

Z—O—CH₂—CH₂—O—CH₂—CH₂—O—CH₂—CH₂—OH, triethylene glycol monoethers $$Z-O-CH_2-\underset{CH_3}{\overset{|}{C}}-H-OH,\ 1,2\ \text{propylene glycol monoethers}$$

$$Z-O-CH_2-\underset{CH_3}{\overset{|}{C}H}-O-CH_2-\underset{CH_3}{\overset{|}{C}H}-OH,\ \text{dipropylene glycol monoethers}$$

Z—O—CH₂—CH₂—CH₂—OH, trimethylene glycol monoethers

Z—O—CH₂—CH₂—CH₂—O—CH₂—CH₂—CH₂—OH, di-(trimethylene glycol) monoethers

Z—O—CH₂—CH₂—CH₂—CH₂—OH, tetramethylene glycol monoethers

Z—O—CH₂—CH₂—CH₂—CH₂—O—CH₂—CH₂—CH₂—CH₂—OH, di-(tetramethylene glycol monoethers)

Although various species of the defined unsaturated alpha, beta dicarboxylic acid can be esterified with the monohydric ether alcohol, butenedioic acids having the general formula $$\text{HOOC}-\underset{}{\overset{R^*}{\overset{|}{C}}}=\underset{}{\overset{R^{**}}{\overset{|}{C}}}-\text{COOH}$$

where R* and R** are each monovalent radicals of the group of H— and alkyl radicals of up to 4 carbon atoms are preferred. Maleic acid, maleic anhydride and fumaric acid are the more practical species, the maleic species being especially preferred.

Useful species of monomers which provide the indicated ester units (B) include the acrylic acid esters of $C_1$ to $C_8$ saturated aliphatic monohydric alcohols and methacrylic acid esters of these alcohols which may be straight chain, branched chain or cyclic in the structure of the organic radical thereof. The acrylates and soft methacrylates are preferred to provide the interpolymer with internal plasticization, especially ethyl acrylate, butyl acrylate, butyl methacrylate and octyl methacrylate. The harder methacrylates can be used in combination with the acrylates and soft methacrylates or used solely as the (B) ester units to provide harder polymers.

Interpolymers having a content of styrene units substantially less than 30 mol percent tend to yield undesirable levels of hardness, gloss, and water and chemical resistance in the ultimate coatings. Flexibility suffers as the proportion of styrene units increases; and, above about 80 mol percent of styrene units, the ultimate coatings are too inflexible or brittle to be generally useful. At least 15 mol percent of the (B) ester units is required to internally plasticize the interpolymer and aid in compatibility with the other film-forming components of the liquid coating composition. Above about 65 mol percent of the (B) ester units, there is no recognized advantage which compensates for the added cost. At least 5 mol percent of the (C) monocarboxylic half ester units is required in the interpolymer to yield inertness and insolubility in the ultimate coatings. Above about 25 mol percent of the (C) monocarboxylic half ester units, undesirably high viscosity, difficulty in reproducibility and sometimes gelation occur in the preparation of the interpolymer. The resulting higher acidity of the interpolymer and of the liquid coating composition prepared therefrom leads toward instability. Higher proportions of the other organic film-former materials are required in combination with the highly acidic interpolymer and the added cost is not offset by further advantages.

The interpolymers are prepared in general by a two-stage process involving, first, preparing an interpolymer of (A) styrene, (B)

$$CH_2=\underset{}{\overset{X}{\overset{|}{C}}}-\text{COOY}$$

ester and the monoethylenically-unsaturated alpha, beta dicarboxylic acid, e.g., maleic anhydride, maleic acid or fumaric acid, using the molar proportions defined above, with the amount of the dicarboxylic acid or anhydride thereof being equivalent on a molar basis to the amount of monocarboxylic half ester desired in the final interpolymer. Then the resulting interpolymer is treated with a monohydric ether alcohol, as defined above, under mild esterification conditions whereby the dicarboxylic moiety in the preformed polymer is converted substantially to the corresponding monocarboxylic half ester. Alternatively, the monomeric monocarboxylic half ester can be prepared separately and included as such in the polymerization recipe. However, because of the smaller size of the copolymerizable dicarboxylic acid or anhydride, it is included preferably in the polymerization recipe and about one half of the carboxyl substituents of the dicarboxylic moieties in the resulting first stage interpolymer are post-esterified with the monohydric ether alcohol to provide the final interpolymer.

The first-stage interpolymers are prepared in general by heating a mixture of the monomers which provide the (A) and (B) units and the dicarboxylic acid or anhydride which provides the dicarboxylic moiety, in the indicated proportions, in the presence of about 25%–400%, based on the weight of said monomer mixture, of an aromatic hydrocarbon solvent for the mixture at a temperature of 125°–200° C. until substantially all of the monomer components thereof are polymerized. The polymerization is preferably conducted in the presence of a normal amount, e.g., about 0.1%–2% based on the weight of said mixture, of a vinyl polymerization initiator which is effective in the indicated temperature range, for example, ditertiarybutyl peroxide, benzaldehyde peroxide, 2,2-bis(tertiarybutylperoxy) butane, tertiarybutyl peracetate, diazoaminobenzene, or cumene hydroperoxide. Conventional polymerization adjuvants such as activators, inhibitors, surface active agents and chain transfer agents can be present but are not required.

The aromatic hydrocarbon solvent can be, for example, benzene, toluene, xylene, mixtures containing such materials in major proportions, and petroleum distillate fractions of dominantly aromatic composition, such as those marketed under the trade names Velsicol Concentrate 70, Sinclair #30 Solvent, Amsco Solvent B, Panasol AN–1, Solvesso 100 and Solvesso 150. It is most convenient to use a solvent which refluxes at the desired polymerization temperature because this permits operating at atmospheric pressure. Solvents having lower atmospheric boiling points can be used in a closed vessel under super-atmospheric pressure. Presence of the solvent during polymerization permits close control of temperature, minimizes batch to batch variations and yields a fluid product having an easily handled consistency. The preferred amount of solvent present during polymerization is about 33%–100% based on the total weight of polymerizable monomers.

The polymerizable components are preferably in substantially monomeric form, i.e., as commercial or technical grade monomers. As provided commercially, they usually contain minute amounts of polymerization inhibitors, which can be, but need not be, removed in practicing this invention.

The polymerization temperature used in preparing the interpolymers of this invention is in the range of 125° C. to 200° C., preferably about 130° to 170° C. Use of these temperatures, substantially above those at which vinyl polymerization is usually conducted, yields products having the desired properties in the ultimate coatings and the desired compatibility in the liquid coating compositions. Use of polymerization temperatures below about 125° C. tend to yield highly viscous interpolymers which, in turn, yield liquid coating compositions having an undersirably low solids content at practical application viscosities. Use of polymerization temperatures above about 200° C. tend to yield low viscosity interpolymers which, in turn, yield coatings which are relatively more brittle than is desired.

The post-esterification step in preparing the final interpolymers is carried out most conveniently by adding the appropriate monohydric ether alcohols as defined, or a mixture of two or more of such monohydric ether alcohols, to the preformed interpolymer solution slowly, in increments or in a single addition, and heating the mixture, with or without refluxing, at a convenient esterification temperature, e.g., in the range of 100° to 200° C. Under these conditions, formation of the monocarboxylic half ester from the dicarboxylic moiety proceeds quite rapidly. Formation of the corresponding diester is avoided or minimized by the mild reaction conditions. An excess of the monohydric ether alcohol, i.e., more than one mol which combines with one mole of the dicarboxylic moiety, can be used and is preferred when the presence of unreacted monohydric ether alcohol can be tolerated in the final liquid composition. Excess of the monohydric ether alcohols which are low boiling species can be removed by fractional distillation; but it is much simpler either to use a monohydric ether alcohol such that an excess can be tolerated or to carefully minimize the amount of the monohydic ether alcohol in its free state which is undesirable in the final composition. The presence of the monohydric ether alcohol can be avoided conveniently by including the monocarboxylic half ester per se in the polymerization recipe.

The preferred interpolymers have relative viscosities in the range of 1.07–1.17 as determined by a procedure fully described hereinafter. The interpolymers in this range are particularly adaptable to liquid coating compositions of the type involved in this invention because (1) their degree of polymerization is sufficient to provide a desirable solids content and viscosity in the liquid coating compositions, a desirable thickness of smooth coating by conventional methods of application, and desirable toughness, durability, film integrity and other physical and chemical properties in the dried coatings, and (2) their degree of polymerization is not sufficient to yield the undesirable or impractical results of gelation, insolubility in common solvents, incompatibility with the other film-forming components of the liquid coating compositions, and uneconomical thin coatings resulting from low solids content at practical application viscosities for the liquid coating compositions.

The epoxidized vegetable oils that are useful in this invention can be purchased on the open market. Examples are "Paraplex" G–60 and G–62 and "Admex" 710. Useful epoxidized oils can be prepared, following known processes such as are disclosed in U.S. 2,569,502, by epoxidizing the naturally-occurring or equivalent oil esters synthesized from glycerol or other polyhydric alcohols, e.g.,sorbitol and the $C_8$–$C_{22}$ vegetable oil acids, of which at least one is ethylenically unsaturated. Examples of such unsaturated oils include soya oil, linseed oil, dehydrated castor oil, perilla oil, cottonseed oil, etc. Epoxidized soya oil is preferred.

The epoxy hydroxy polyether resins that are useful in this invention are also available on the open market, for example, "Epon"–828, –1001, –1004, –1007; "Araldite"–6030, –6071, –6084, –6097; and "Epi-Rez"–510, –520, –530C, –540. Alternatively, the epoxy hydroxy polyether resin can be prepared by condensing a polyhydric phenol, preferably diphenylol propane, with an epihalohydrin or a polyepoxy compound, preferably epichlorohydrin, in accordance with well known methods, such as those disclosed in U.S. 2,503,726, 2,528,985, 2,592,560 and 2,694,694. These epoxy hydroxy polyether resins contain one or more 1,2-oxirane groups per molecule. Those having an average of more than one such epoxy group per molecule are preferred. Useful fatty acid esters of epoxy hydroxy polyether resins are of the type described in U.S. 2,456,408.

The melamine-formaldehyde-alcohol, urea-formaldehyde-alcohol and benzoguanamine-formaldehyde-alcohol condensates, also referred to herein for the sake of brevity as melamine, urea and benzoguanamine components, which are useful in the coating compositions of this invention are the types commonly used in organic baking enamels. They are prepared by well known methods involving, fundamentally, reacting melamine and formaldehyde or a reaction product thereof, e.g., penta- or hexamethylol melamine, with a $C_1$ to $C_4$ saturated aliphatic monohydric alcohol, i.e., methanol, ethanol, propanol, or butanol, usually in excess of the amount required to etherify all of the methylol groups; reacting urea and formaldehyde or a reaction product thereof, e.g., dimethylol urea, with one of the indicated $C_1$-$C_4$ alcohols; or reacting benzoguanamine and formaldehyde or a reaction product thereof with the $C_1$-$C_4$ alcohol. Suitable methods are disclosed in U.S. 2,191,956 and 2,197,357. A wide variety of suitable condensates of these types are readily available in the resin market usually in the form of solutions containing 50%–60% of the non-volatile condensate in a convenient volatile solvent. Coating resins of these classes are commercially available by several suppliers under such trade names as "Resimene," "Uformite," "Plaskon," "Beetle," "Melmac" and "Beckamine."

Although some improvement in a particular property of a baking enamel may be obtained using ingredients, proportions and procedures generally like but slightly outside the specified limits of 30% to 95% by weight of the interpolymer, and, complementally, 70% to 50% of the modifying second organic film-forming component operation within these limits is important if the optimum improvement is to be obtained. In this sense and to this extent, these limits are critical. The balance of properties of compositions outside these proportions, although suitable for some coating applications, is not what is usually required of enamels for the previously described end uses or for other baking enamel uses. A preferred range of proportions, especially for electrical appliance enamels, is 60%–90% of the interpolymer and, complementally, 40%–10% of the modifying second organic film-forming component.

Examples of suitable pigments are metal oxides, hydroxides, chromates, silicates, sulfides, sulfates and carbonates, carbon blacks, organic dyestuffs and lakes thereof and metal flake pigments like aluminum. Since the interpolymers contain free carboxyl groups, acid-sensitive and strongly basic reacting pigments are preferably avoided. The amount of pigment is not critical. It usually is within the range of 1%–200% by weight of the total organic film-forming material present.

Suitable solvents, and diluents which can be used in admixture with solvents, include aromatic and aliphatic hydrocarbons, alcohols, ketones, and esters. Mixtures of aromatic hydrocarbons, such as xylene, and aliphatic monohydric alcohols, such as butanol, are preferred. The solvent or solvent mixture, and any diluent which may be used, preferably characterized by a boiling end point no greater than 200° C., must be volatile to the extent that it evaporates readily from a wet coating during the subsequent baking, i.e., drying or curing, step and leaves a dry coating. The amount of solvent, plus diluent if used, is not critical. It usually is within the range of 10%–85% of the total coating composition.

A peculiar advantage of these liquid coating compositions is that quaternary ammonium compounds, tertiary amines and salts thereof, known latent activators or catalysts for organic film-forming compositions containing a combination of carboxyl and 1,2-oxirane (epoxy) functionalities, can be included at effective curing proportions with the reactive organic film-forming components in a single package of the liquid coating composition.

Heretofore known liquid coating compositions having reactive functionalities curable with these activators are found to be sufficiently reactive at ordinary storage temperatures to necessitate combining the activator and the uncatalyzed composition immediately prior to use of the coating, thus preventing packaging of the catalyzed composition as a single unit.

Typical useful latent activators include organic solvent soluble quaternary ammonium compounds, e.g., quaternary ammonium hydroxide, octadecyltrimethyl ammonium acid phthlate, octadecyltrimethyl ammonium chloride, lauryltrimethyl ammonium acid phthalate, dilauryldimethyl ammonium acid phthalate, benzyltrimethyl ammonium acid phthalate, benzyltrimethyl ammonium chloride, benzyltrimethyl ammonium acetate, benzyltriethyl ammonium formate, tripropylbenzyl ammonium chloride, benzyldimethyl ammonium hexoate, benzyldimethyl ammonium octoate, triethylamine, dimethylethylamine, dipropylethylamine, etc. Useful proportions range ordinarily from 0.1 to 2% based on the organic film-forming materials.

Use of these soluble activators and similar catalysts as a post-additive to uncatalyzed compositions is described in the prior art, e.g., in Hicks, U.S. Patent No. 2,934,516 and in pending application Vasta, Serial No. 757,108 filed August 25, 1958, now U.S. Patent No. 2,967,162. In place of these soluble activators can be used the latent organo-ammonium activators which are solids and ordinarily insoluble in the liquid coating composition at usual storage temperatures, such as described in the copending application Vasta, Serial No. 856,938, filed December 3, 1959, now U.S. Patent No. 3,065,195. The invention described therein relates to organo-ammonium-organo-borate salts wherein the ammonium cation includes at least one hydrocarbon radical joined to the ammonium nitrogen and the organo-boran anion includes four electronegative radicals joined to boron, at least three being aryl, e.g., octadecyl, -trimethylammonium tetraphenyl borate. The invention of copending application Fang, Serial No. 856,939, filed December 3, 1959, now U.S. Patent No. 3,048,552, relates to substantially insoluble quaternary ammonium salts having an inorganic anion composed of at least 5 atoms including at least two covalently-joined chemical elements, e.g., $-ClO_4^-$, $-PF_6^-$, $-BF_4^-$, $-SiF_6^=$, $-MoO_4^=$, $-CrO_4^=$, etc., these salts being useful latent catalysts.

Use of these insoluble latent catalysts or activators in prior art compositions provides significant improvement in the package stability of the catalyzed composition. These latent activators in combination with the liquid coating compositions of this invention exhibit further enhancement of the stability of the single unit package. Aside from whether the activator is included in a unit package or added to the liquid coating composition immediately prior to application, the invention interpolymer and the coating composition prepared therefrom leads to desirable improvements in the cured finish, e.g., improved gloss and improved stain resistance.

The coating compositions of this invention can be applied by any conventional method such as spraying, brushing, dipping, flowing or roller coating. Spraying is preferred. The coatings are baked by conventional methods to harden and insolubilize them and to develop the improved properties to an optimum degree. Baking times and temperatures are not critical but, in order to obtain the best results, the widely used commercial baking schedules are preferred. These range from 45–60 minutes at about 250° F. to 10–20 minutes at about 400° F. The optimum range is usually from 25–30 minutes at about 280° F. to 15–20 minutes at 350° F.

The following examples are provided to illustrate the principles and practice of this invention, but its scope is not limited to the exact details of these illustrative examples. Unless otherwise indicated, the parts and percentages are given by weight.

Preparation of Interpolymer A

First Portion: Parts by weight
Aromatic hydrocarbon, boiling range 150°–190° C.—aniline point −28° C. ("Solvesso" 100) _____ 141.5

Second Portion:
Styrene _____ 173.2
Ethyl acrylate _____ 115.4
Maleic anhydride _____ 41.3
Monobutyl ether of ethylene glycol _____ 99.6
Di-tertiary butyl peroxide _____ 3.5

Third Portion:
Xylol, boiling range 135°–146° C., aniline point −44° C. _____ 125.5

_____
700.0

The first portion is charged into a polymerization reaction vessel equipped with stirring means, reflux means and temperature control means and heated to reflux temperature, i.e., about 165° C. Then the premixed second portion is added with moderate stirring to the refluxing first portion at a uniform rate during a two-hour period, the temperature being held at 155° to 165° C. Refluxing of the charge is continued for two additional hours, the resulting polymer solution is then cooled to about 120° C., and thereafter the third portion, i.e., the xylol solvent is added to complete the interpolymer solution composition. The resulting interpolymer is made up essentially of units in the following proportions: 51.4 mols percent styrene, 35.6 mols percent ethyl acrylate and 13 mols percent butoxyethyl acid maleate which correspondingly on a weight basis is about 45% styrene, 30% ethyl acrylate and 25% butoxyethyl acid maleate. The resulting solution of the interpolymer in the mixture of hydrocarbon solvents and unreacted monobutyl ether of ethylene glycol is characterized as follows:

Interpolymer content _____percent__ 53.1
Acid number _____ 62
Gardner-Holdt viscosity _____ X+⅓ at 25° C.
Relative viscosity _____ 1.1313

Relative viscosity is determined by first spreading about 2–3 cc. of interpolymer solution over an area of about 3 square inches in an aluminum foil dish and heating the thus-prepared sample dish in an oven at about 120° C. for 3 hours to obtain interpolymer substantially free from solvent. From the resulting dry interpolymer, a solution is made containing 0.50 gram of interpolymer in 50 ml. of ethylene dichloride. The efflux time of this solution is measured at 25° C. in accordance with ASTM–D–445–53T using the solution as the "oil" in said ASTM determination. A Cannon-Fenske (modified Ostwald) viscosimeter for transparent liquids, series or size number 100, is used in accordance with Appendix A of the determination. The efflux time of a sample of the ethylene dichloride used in making said solution is likewise determined. Relative viscosity, $N_r$, of the interpolymer is calculated from the equation:

$$N_r = \frac{\text{efflux time of polymer solution}}{\text{efflux time of ethylene dichloride}}$$

EXAMPLE 1

*Preparation of Pigment Dispersion 1*

Parts by weight
Titanium dioxide pigment _____ 456.0
Interpolymer A solution—53.1% polymer content _____ 159.7
Butyl alcohol _____ 165.9
Aromatic hydrocarbon ("Solvesso" 100) ____ 18.4

_____
800.0

The respective components are charged into a pebble mill, ground for 72 hours, and separated from the grinding medium.

*Preparation of enamel composition*

Parts by weight
Pigment dispersion 1 _____ 473.1
Interpolymer A solution—53.1% polymer content _____ 341.5
Epoxy resin solution—50% "Epon" 1001 resin content in equal parts by weight of xylol and anhydrous isopropanol _____ 119.8
Wax dispersion—14.8% wax _____ 18.2
Anhydrous isopropanol _____ 31.9
Catalyst solution—20% catalyst content _____ 2.5

_____
987.0

The epoxy resin is the resinous polyether product having 1,2-oxirane groups and hydroxyl groups resulting from condensation of diphenylol propane and epichlorohydrin in proportions of these reactants and under conditions which yield a resin characterized by an epoxide equivalent weight in the range of 450 to 525, an esterification equivalent weight of about 145 and a melting point in the range of 64° to 76° C. by the Durran mercury method. "Epon" 1001 epoxy resin is a commercially available epoxy resin having these characteristics. The wax dispersion is prepared by pebble grinding the following composition for 72 hours.

Parts
Interpolymer A solution _____ 31.5
Wax Cardis polymer #10 _____ 14.8
Butyl alcohol _____ 52.2
Ethylenediamine tetraacetic acid _____ 1.5

_____
Total weight _____ 100.0

Cardis polymer #10 wax is a polymerized-oxidized wax of petroleum origin characterized by the ASTM–D–87–57 melting point of 100°–103° C., saponification number of 25 to 30 and an acid number of 8 to 10. Waxes of equivalent characteristics and polyethylene wax can be used in place of the Cardis #10 wax. The catalyst solution is 20% by weight of octadecyltrimethylammonium acid phthalate in xylol.

The respective components of the enamel composition are combined and mixed until the composition is uniform.

*Comparative Enamel Composition 1*

Preparation of Comparative
Interpolymer I: Parts by weight
First Portion:
Aromatic Hydrocarbon — "Solvesso" 100 _____ 141.5

Second Portion:
Styrene _____ 173.2
Ethyl acrylate _____ 115.4
Maleic anhydride _____ 41.3
2-ethylhexanol _____ 109.8
Ditertiarybutyl peroxide _____ 3.5

Third Portion:
Xylol _____ 115.3

_____
700.0

This composition is similar to that of the polymerization charge for Interpolymer A except for substitution of an equivalent amount of 2-ethylhexanol for the monobutylether of ethylene glycol, weight differences being compensated by an alteration in the xylol content. The method of carrying out the polymerization is the same as the procedure used in the preparation of Interpolymer A solution. The resulting comparative interpolymer solution is characterized as follows:

Interpolymer content _____ percent__ 55.4
Gardner-Holdt viscosity _____ Z-3+⅓ at 25° C.
Acid number _____ 58

*Preparation of comparative enamel composition*

This enamel composition is prepared in the same manner as that shown for Example 1, the final composition differing essentially only in reference to the substitution of the Comparative Interpolymer I for Interpolymer A.

The Example 1 and Comparative Example I compositions are characterized by:

Total non-volatile content—58%.
Pigment-to-binder ratio by weight—90/100.
Catalyst content—0.166% based on the organic film-forming material.
Wax content—1% based on the weight of the pigment.
Ratio of organic film-forming materials—80 parts of interpolymer and 20 parts of epoxy resin per 100 parts by weight thereof.

These described enamels are particularly useful as a "one-coat" topcoat for unprimed refrigerator cabinets. They are evaluated for this use by thinning 4 pints of the respective enamels to spraying consistency by admixing therewith 1 pint of toluene. The resulting thinned enamel is sprayed in an industrial manner on "Bonderite"-treated steel refrigerator cabinet panels in such an amount as to provide continuous coatings having a dry thickness of 1.6 to 1.8 mils. The thus coated panels are then baked for 30 minutes at 350° F. After cooling to room temperature, the respective enamels on these panels are evaluated comparatively. The new enamel of Example 1 exhibits significant improvement over the comparative enamel in reference to flexibility, 20° gloss and solvent resistance. Other important properties such as hardness, abrasion-resistance, impact resistance, salt-spray resistance, resistance to high temperature-high humidity conditions, resistance to discoloration and/or deterioration from grease, alkaline soaps, detergents, foods, kitchen fumes, and heat, and resistance to staining by mustard, catsup, vinegar, orange dye, and lipstick of the baked enamel of Example 1 are at least equal to those of the comparative enamel which in turn is recognized as superior to representative commercially-used "one-coat" refrigerator enamels based on a mixture of alkyd resin, urea-formaldehyde-condensate and melamine-formaldehyde-alcohol condensate.

Another set of panels prepared similarly is baked for 30 minutes at 320° F. and a third set is baked for 30 minutes at 300° F. The respective panels representing the Example 1 enamel exhibit the aforementioned improvements over the comparative enamel under these lower temperature curing conditions.

In a second series of tests, the respective enamels are comparatively evaluated at a dry coating thickness of about 2.8 to 3 mils corresponding to double-coat thickness. The Example 1 enamel under these conditions likewise exhibits the significant improvements over the comparative enamel.

Another important advantage of the Example 1 enamel is that the liquid coating composition exhibits significant improvement in package stability over the comparative liquid coating composition. Samples of the respective compositions are aged in hermetically sealed containers in an oven at 120° F. and are examined periodically thereafter at 72° F. for viscosity change. The Example 1 composition exhibits 100% increase in viscosity from the initial viscosity of 18 seconds #3 Zahn cup in 35 days. The comparative enamel exhibits an increase in viscosity of 310% in the same period of time, 650% increase in 42 days and gels in 49 days. The respective viscosity increases of the Example 1 composition are about 140% in 42 days and 220% in 49 days at 120° F. At room temperature of about 77° F., the viscosity increase of the Example 1 composition is a uniform increase to about 60% during six months' storage.

A second Comparative Enamel II is formulated similarly to the composition of Comparative Enamel I using a corresponding two-stage Comparative Interpolymer II prepared by initially preparing the maleic acid terpolymer and subsequently reacting one half of the carboxyl groups of the carboxylic terpolymer with 2-ethylhexanol to form the half ester. The preparation of these esterfied carboxylic terpolymer is described in detail in copending Vasta, Serial No. 757,108, filed August 25, 1958, now U.S. Patent 2,967,162. The ethylenediamine tetraacetic acid is omitted from the wax composition and thus it is not present in the final product.

The cured Example 1 enamel exhibits significant improvements over cured Comparative II enamels which are equivalent in performance to the Comparative I enamels. The superiority of the package stability of the Example 1 liquid coating composition over the Comparative II composition is even more significant. The catalyzed Comparative II composition exhibits a 50% increase in viscosity in 7 days and is gelled in less than 14 days when stored at 120° F. At room temperature, this catalyzed comparative composition exhibits a viscosity increase of 315% in 4 months and is gelled in less than six months. This instability of the catalyzed Comparative II composition necessitates ordinarily the omission of the latent catalyst from the package and addition of the catalyst to complete the formulation immediately prior to application.

EXAMPLE 2

*Preparation of Interpolymer B solution*

| | Parts by weight |
|---|---|
| First portion: | |
|     Aromatic hydrocarbon | 141.5 |
| Second portion: | |
|     Styrene | 168.6 |
|     Ethyl acrylate | 112.3 |
|     Maleic anhydride | 40.2 |
|     Monobutylether of diethylene glycol | 53.2 |
|     Di-tertiary butyl peroxide | 3.4 |
| Third portion: | |
|     2-ethylhexanol | 24.0 |
|     Xylol | 156.8 |
| | 700.0 |

The ingredients are the same as specified in the recipe for the Interpolymer A solution except that the composition contains the monobutyl ether of diethylene glycol, i.e., butyl "Carbitol," in place of the monobutylether of ethylene glycol and also contains 2-ethylhexanol in an amount of about 45% of the theoretical amount necessary to form the half ester of the maleic acid. The polymerization procedure follows that described for Interpolymer A. The interpolymer solution is characterized by:

Interpolymer content _____ percent__ 54.4
Gardner-Holdt viscosity _____ Y-⅛ at 25° C.
Acid number _____ 66.4
Relative viscosity _____ 1.117

*Preparation of the coating composition*

A liquid coating composition is prepared following the same recipes described in Example 1 substituting for the Interpolymer A solution, the above-described Interpolymer B solution on the basis of equal interpolymer weight.

This coating composition comparatively evaluated as heretofor described for Example 1 shows that the Example 2 composition provides the same improvements over the Comparative Enamel I and that the performance is equal to that of the Example 1 composition. This catalyzed composition is package-stable from a practical viewpoint for a period of at least six months at room temperature. Under accelerated aging conditions at 120° F., this composition exhibits a 100% increase in viscosity in 25 days and remains liquid during 49 days.

In still another series of enamel compositions, dodecyltrimethylammonium perchlorate is used as the catalyst, in place of the octadecyltrimethylammonium acid phthalate, in the usual proportion of about 0.7% based on the

|  | Interpolymer C Solution | Interpolymer D Solution | Interpolymer E Solution | Comparative Interpolymer II Solution |
|---|---|---|---|---|
| First Portion: | | | | |
| Aromatic Hydrocarbon ("Solvesso" 100) | 3,597 | 3,597 | 3,597 | 3,597 |
| Xylol | 1,209 | 1,200 | 1,200 | 1,200 |
| Second Portion: | | | | |
| Styrene | 6,020 | 6,020 | 6,020 | 6,020 |
| Ethyl Acrylate | 4,013 | 4,013 | 4,013 | 4,013 |
| Maleic Anhydride | 1,436 | 1,436 | 1,436 | 1,436 |
| Di-tertiary Butyl Peroxide | 119 | 119 | 119 | 119 |
| Third Portion: | | | | |
| Butyl "Cellosolve" | 3,462 | | | |
| "Cellosolve" | | 2,461 | | |
| "Carbitol" | | | 3,931 | |
| 2-ethylhexanol | | | | 3,816 |
| Fourth Portion: | | | | |
| Aromatic Hydrocarbon ("Solvesso" 100) | 1,386 | 1,386 | 1,386 | 1,386 |
| Xylol | 2,767 | 2,857 | 2,724 | 2,734 |
|  | 24,000 | 23,089 | 24,426 | 24,321 |

In the preparation of these interpolymer solutions, the polymerization follows essentially the procedure outlined for Interpolymer A. In these recipes, the first portion hydrocarbon mixture provides a lower reflux temperature, e.g., in the range of about 135° to 150° F. One half of the second portion monomer mixture is added at a uniform rate of about 8% during a 15-minute period and the remaining half is added at the rate of about 8% during a 20-minute period. Polymerization conditions are maintained for two hours after the final monomer addition. Then the respective monohydric alcohols of the thrid portions are added to the respective carboxylic interpolymer solutions and reflux conditions are continued for two hours during which time the maleic acid units of the interpolymer are converted to maleic half ester units. Then cooling of the interpolymer solutions is initiated and the respective fourth portions are added when the temperature is below the boiling temperature of the fourth portion.

The resulting interpolymer solutions have the following characteristics:

|  | Interpolymer C | Interpolymer D | Interpolymer E | Comparative Interpolymer III |
|---|---|---|---|---|
| Percent Interpolymer Content | 53.2 | 53.7 | 51.8 | 55.6 |
| Gardner-Holdt Viscosity | Z-1+¼ | Z-1+½ | Z+½ | Z-5+¼ |
| Acid Number | 63.7 | 65.6 | 61.5 | 602. |
| Relative Viscosity | 1.123 | 1.146 | 1.196 | 1.119 |

These several interpolymer solutions are formulated as pigmented enamel compositions using the same recipes as shown in Example 1, substituting the respective interpolymers for Interpolymer A on an equal weight basis.

All the resulting enamels containing these Interpolymers C, D and E exhibits the same important improvements over the enamel formulated with the Comparative Interpolymer III as are observed in the comparison between the Example 1 enamel and the comparative enamels.

In another series of enamel compositions having the same formulation, the catalyst concentration is varied from the usual proportion of about 0.2% of octadecyltrimethylammonium acid phthalate based on the organic film-forming material down to 0% in four equal increments, i.e., in steps of 0%, 25%, 50%, 75% and 100% of the usual amount of catalyst. Comparative results show that these enamels having 50% to 75% of the usual catalyst proportion are characterized by performance at least equal to the comparative enamels containing 100% of the usual proportion of catalyst. Use of such lower proportions of catalyst to effect the cure enhances the package stability and pot-life of the catalyzed composition.

weight of the organic film-forming materials, and the proportion of this catalyst is varied from 0% to 100% of the usual proportion in four equal increments. Again, comparative results show that the invention compositions containing 50% to 75% of the usual proportion of the latent catalyst specified in the comparative enamel compositions provides equivalent cure under the same curing conditions. This equivalent curing at lower catalyst proportions is attributed to the presence of an ether oxygen not more than 6 carbon atoms removed, preferably 2 to 4 carbon atoms removed, from the hydroxyl radical of the monohydric ether alcohol component of the (C) ester units.

Similar quality, performance and stability improvements are achieved when the respective Interpolymers A, B, C, D, and E are substituted on an equal weight basis for the respective interpolymers specified in the several examples of coatings described in Vasta, Serial No. 757,108, filed August 25, 1958, now U.S. Patent 2,967,162, i.e., in Examples 1 through 6 and 10, these compositions being catalyzed as described.

Substitution of either methoxyethanol, methoxyethoxyethanol, monoethylether of triethylene glycol, monoethylether of tetramethylene glycol, monobutylether of triethylene glycol, monobutylether of tetramethylene glycol, monoethylether of hexanediol, monolaurylether of ethylene glycol, monolaurylether of diethylene glycol, monophenylether of ethylene glycol, monobenzylether of ethylene glycol, and low molecular weight ethyl, propyl or butyl monoethers of mixed polyoxyalkylene glycols having units from ethylene oxide in combination with units from either propylene oxide or units from tetramethylene glycol in the polyoxyalkylene structure for the esterifying monohydric ether alcohol in the interpolymer recipes for Interpolymers A through E and other recipes having the preferred proportions of the polymerizable monomers provides additional useful carboxylic interpolymers. These interpolymers also provide the indicated desirable improvements in the quality and performance of the resulting enamels when they are specified as the organic film-forming material either solely or in combination with other organic film-forming materials compatible

I claim:

1. An interpolymer, at least ternary in composition, made up essentially of (A) units from styrene, (B) units from at least one ester of the general formula $$CH_2=\underset{X}{\overset{}{C}}-COOY$$

where —X is a monovalent radical of the group of H— and CH$_3$— and —Y is a C$_1$ to C$_8$ saturated aliphatic monovalent hydrocarbon radical, and (C) units from at least one monocarboxylic half ester of an alpha, beta monoethylenically unsaturated alpha, beta dicarboxylic acid having the general formula $$HOOC-\underset{R^*}{\overset{}{C}}=\underset{R^{**}}{\overset{}{C}}-COOH$$

where R* and R** are each monovalent radicals selected from the group consisting of H— and C$_1$ to C$_4$ alkyl radicals, and a monohydric ether alcohol having the general formula $$Z-O-(-R'''-O-)_c-(-R''-O-)_b-(-R'-O-)_a-R-OH$$

where —R— is a C$_2$ to C$_6$ divalent saturated aliphatic hydrocarbon radical, —R'—, —R''— and —R'''— each are a C$_2$ to C$_4$ divalent saturated aliphatic hydrocarbon radical; a, b, and c are each integers having the value of 0, 1, 2, 3, 4, etc., the values of a, b, and c being such that the total number of carbon atoms in the monohydric ether alcohol molecule is from 3 to 30, Z—O— is a monovalent organic radical having a C$_1$ to C$_{18}$ monovalent hydrocarbon radical Z—, free from polymerizable unsaturation, joined to an ether oxygen atom; and wherein the interpolymer has 30 to 80 mol percent (A), 15–65 mol percent (B), and 5–25 mol percent (C).

2. An interpolymer of claim 1 having as the dicarboxylic acid moiety of said (C) units a C$_4$ butenedioic moiety.

3. An interpolymer of claim 2 wherein said butenedioic moiety is that of maleic acid.

4. An interpolymer of claim 3 wherein said (C) units from the monocarboxylic half ester are units from a maleate half ester of a monoether of a polymethylene glycol, said monoether alcohol having the general formula Z—O—R—OH where —R— is a C$_2$ to C$_6$ divalent saturated aliphatic hydrocarbon radical and Z— is a C$_1$ to C$_{18}$ saturated aliphatic monovalent hydrocarbon radical.

5. An interpolymer of claim 4 wherein said maleate half ester is the maleic acid half ester of ethylene glycol monobutylether.

6. An interpolymer of claim 3 wherein said (C) units from the monocarboxylic half ester are units from a maleate half ester of a polyoxyalkylene glycol monoether characterized by said general formula $$Z-O-(-R'''-O-)_c-(-R''-O-)_b-(-R'-O-)_a-R-OH$$

for the monohydric ether alcohol wherein at least "a" of "a," "b" and "c" is an integer having a value of at least 1, and Z— is a C$_1$ to C$_{18}$ saturated aliphatic monovalent hydrocarbon radical.

7. An interpolymer of claim 6 wherein said half ester is the maleic acid half ester of said polyoxyalkylene glycol monoether wherein the divalent radicals —R— and —R'— are each —CH$_2$—CH$_2$— and the numerical value of "a" is at least 1, "b" and "c" each being 0.

8. An interpolymer of claim 7 wherein said maleate half ester is the maleic acid half ester of diethylene glycol monobutylether.

9. An interpolymer of claim 1 made up of 40 to 70 mol percent of (A) units from styrene, 20 to 50 mol percent of (B) units from ethyl acrylate and 10 to 20 mol percent of (C) units from a maleic half ester of an aliphatic C$_3$ to C$_{24}$ monohydric ether alcohol having said general formula $$Z-O-(-R'''-O-)_c-(-R''-O-)_b-(-R'-O-)_a-R-OH$$

with Z— being a C$_1$ to C$_{18}$ saturated aliphatic monovalent hydrocarbon radical.

10. A liquid coating composition comprising, as the essential organic film-forming material, a compatible mixture of (1) 30%–95% by weight of an interpolymer of claim 1, and (2) 70%–5% of at least one member of the class consisting of melamine-formaldehyde-monohydric alcohol condensates, urea-formaldehyde-monohydric alcohol condensates, benzoguanamine-formaldehyde-monohydric alcohol condensates, an epoxy hydroxy polyether resin, an epoxy hydroxy polyether resin esterified in part with a fatty acid, and epoxidized vegetable oils; said film-forming material being in solution in volatile organic solvent therefor.

11. A coating composition of claim 10 further containing pigment.

12. A coating composition of claim 10 further containing an activator from the group of quaternary ammonium compounds, tertiary amines and salts thereof.

13. A liquid coating composition consisting essentially of a mixture of about 40%–85% by weight of an interpolymer of claim 1 and 60%–15% by weight of at least one member of the class consisting of melamine-formaldehyde-monohydric alcohol condensates, urea-formaldehyde-monohydric alcohol condensates, and benzoguanamine-formaldehyde-monohydric alcohol condensates, an epoxy hydroxy polyether resin, an epoxy hydroxy polyether resin esterified with a fatty acid, and epoxidized vegetable oils; said mixture being in solution in volatile organic solvent therefor, pigment, and a quaternary ammonium activator.

References Cited by the Examiner

UNITED STATES PATENTS

| | | | |
|---|---|---|---|
| 2,425,755 | 8/1949 | Roberts et al. | 260—615 |
| 2,537,016 | 1/1951 | Barrett | 260—78.5 |
| 2,808,393 | 10/1957 | Harris | 260—78.5 |
| 2,892,819 | 6/1959 | Stewart et al. | 260—78.5 |
| 2,934,516 | 4/1960 | Hicks | 260—23 |
| 2,967,162 | 1/1961 | Vasta | 260—21 |
| 3,004,958 | 10/1961 | Berens | 260—78.5 |

LEON J. BERCOVITZ, *Primary Examiner.*

ALFONSO D. SULLIVAN, DANOLD E. CZAJA,
*Examiners.*

R. W. GRIFFIN, J. W. BEHRINGER,
*Assistant Examiners.*